United States Patent [19]

Godard et al.

[11] Patent Number: 4,518,516

[45] Date of Patent: May 21, 1985

[54] SODIUM METASILICATE PARTICULATES AND DETERGENT COMPOSITIONS COMPRISED THEREOF

[75] Inventors: Gerard Godard, Chateau Thierry; Daniel Joubert, Trevoux; Philippe Gagnaire, Charly/sur/Marne, all of France

[73] Assignee: Rhone-Poulenc Chimie De Base, Courbevoie, France

[21] Appl. No.: 512,888

[22] Filed: Jul. 11, 1983

[30] Foreign Application Priority Data

Jul. 9, 1982 [FR] France ............... 82 12068

[51] Int. Cl.³ ........................... C11D 17/06
[52] U.S. Cl. ........................... 252/91; 252/174; 252/174.13; 23/313 AS
[58] Field of Search ............ 252/91, 99, 135, 174, 252/174.13; 23/313 AS; 423/332

[56] References Cited

U.S. PATENT DOCUMENTS

| | | | |
|---|---|---|---|
| 2,860,033 | 11/1958 | Mockrin | 23/313 |
| 3,687,640 | 8/1972 | Sams | 23/313 |
| 3,748,103 | 7/1973 | Bean et al. | 23/313 |
| 4,253,849 | 3/1981 | Vrisakis et al. | 423/332 |
| 4,289,643 | 9/1981 | Joubert | 252/135 |

Primary Examiner—Paul Lieberman
Assistant Examiner—Hoa V. Le
Attorney, Agent, or Firm—Burns, Doane, Swecker & Mathis

[57] ABSTRACT

Novel granular particulates of sodium metasilicate, well adapted for improved detergency applications, are comprised of a central core of essentially anhydrous sodium metasilicate and a core-enveloping sheath of sodium metasilicate pentahydrate therefor, the amount of water which comprises said sodium metasilicate pentahydrate comprising at least 10% by weight, and advantageously from 10 to 20 or 25% by weight, of the total weight of said particulates.

25 Claims, 1 Drawing Figure

Fig. 1

SODIUM METASILICATE PARTICULATES AND DETERGENT COMPOSITIONS COMPRISED THEREOF

BACKGROUND OF THE INVENTION

1. Field of the Invention

The present invention relates to novel granules of sodium metasilicate, a process for the preparation thereof, and the utilization of same in detergency applications, especially in detergent compositions designed for the cleaning of household dishes and like kitchenware.

2. Description of the Prior Art

Sodium metasilicate is a well-known product which is particularly suited for detergent compositions useful in dishwashers, providing the same with the required alkalinity while at the same time being less aggressive than the other alkaline salts. Indeed, in spite of its alkalinity, it is but slightly corrosive when in contact with glass and light metals such as aluminum. Furthermore, it displays the advantage of possessing interesting detergency properties, such as desirable emulsifying activity and is a potent anti-redeposition agent.

Hence, it is frequently incorporated into detergent compositions designed for cleaning dishes and the like. However, presently, solid detergent compositions for washing dishes in an automatic washing machine are manufactured according to the technique known as "dry mixture", to a point where the physiochemical characteristics of said compounds essentially correspond to those of the basic materials, since the method of mixing alters them either very slightly or not at all.

Raw materials, and especially sodium metasilicate, the most important one, must therefore provide an entire spectrum of often contradictory specifications. Thus, the sodium metasilicate must be provided in such fashion that it satisfies the following requirements:

(1) Since detergent compositions for dishwashers are distributed to a broad segment of the population, a good visual appearance is required which implies acceptable aesthetic whiteness, well-rounded grains having an appropriate average diameter, and a narrow granulometric distribution which excludes the finest particles and the largest ones as might generate a feeling of heterogeneity;

(2) Aside from the aforenoted visual and tactile characteristics, in order to be accepted by the user, detergent compositions for dishwashers must be dense, concentrated products. Therefore, the raw materials must have a high specific gravity, exceeding 1 and an optimized water content such as not to result in too great a dilution of the composition. The seemingly high density is also required due to the relatively small size of the mechanical distributors therefor which are incorporated into the typical dishwashing machines;

(3) The various raw materials must also be harmless and non-toxic to the user. However, sodium metasilicate might be considered a relatively cautic compound. One of its well-known disadvantages is that it gives rise to a temporary irritation of the user's mucous membranes which translates into tingling sensations in the nose, as well as sneezing. This respiratory affliction is caused by the generation of extremely fine sodium metasilicate particles that stem from erosion or destruction (attrition) of larger particles during the various mechanical handlings to which the product is subjected. Usually, one employs the expression "dusting" to define this phenomenon and the concept of dusting makes it possible to quantify the aggressiveness or corrosiveness of dishwashing formulae. One of the reasons sodium metasilicate is a relatively corrosive product stems from its alkalinity. And yet, such alkalinity becomes absolutely necessary as a result of the "effectiveness" imperative which is impossible to sacrifice, such that there is a problem that must be resolved in view of the dual requirements which are antagonistic or competing;

(4) The raw materials must be stable under storage and they must also be quite resistant to binding. Same must also be compatible with the other usual constituents of dishwashing detergent compositions. They must not effect any deterioration of the odorants, the chlorine-releasing ingredients (sodium dichloroisocyanurate), nor the non-ionic surface active agents.

Among the surfactants typically employed, representative are compounds prepared from ethylene oxide and polypropylene glycols or from ethylene oxide and the alkylphenols. Unfortunately, the compositions resulting from admixture of the typical detergent additives and anhydrous sodium metasilicate are not stable. One notes especially the emergence of coloring upon completion of a particular storage period, as well as the development of unacceptable odors, especially with an aldehyde base;

(5) Finally, the raw materials must be adopted for operative distribution in dishwashing machines. This latter point is one of the most significant and it embraces both the ability of the product to be evacuated from the automatic distributor, and to dissolve as quickly and as thoroughly as possible during the "washing" sequence of the machine cycle.

From the foregoing, it will be appreciated that it is extremely difficult to develop a raw material which enables the sodium metasilicate to meet all the previously mentioned imperatives that are often contradictory.

To date, the raw materials in question which are anhydrous sodium metasilicate, slightly hydrated sodium metasilicate, pentahydrated sodium metasilicate in the form of spheres, particulates or granulates, have not proven altogether satisfactory.

One can incorporate into detergent compositions for dishwashers an almost anhydrous sodium metasilicate which contains no more than 0.2% of water which results from the fusion of sodium carbonate and sand, followed by cooling, grinding and sifting, between 0.4 and 1.4 mm, for example.

The benefits from such a product are its extremely high apparent density which originates from its but slight porosity and its high concentration due to the extremely low water content, as well as the lack of binding risks as a result of greater temperatures and adequate compatibility with chlorine-releasing ingredients.

The disadvantages are far more prevalent: its appearance is that of a product which has been ground, the individual grains of which display sharp edges, and the whiteness of which is not clear and depends largely upon the raw materials because its method of manufacture does not include a purification step. Dusting is also a problem, and its compatibility is poor with non-ionic surface active agents. It is also a product which is chemically fairly caustic due to its anhydrous character and that, in the event of increased hygroscopicity, it can bind. Finally, its ability to dissolve in the dishwashing water too is poor.

In order to alleviate certain of the disadvantages of the anhydrous sodium metasilicate, it has been proposed to granulate same. One can prepare low water content granules from an aqueous sodium metasilicate solution having a molar ratio of $SiO_2/Na_2O$ which equals 1 by granulating and then drying same. According to a technique which is described in French patent application No. 77/29001, published under No. 2,403,974, and U.S. Pat. No. 4,253,849, particulates having a water content of 2 to 6% of water are prepared via a method which entails contacting the anhydrous sodium metasilicate with a sodium metasilicate liquor, by atomizing said liquor onto the mass of anhydrous sodium metasilicate particles which are maintained in motion by the rotation of a drum which is equipped with lifting blades, thus generating the formation of particle clouds, the particles are then subjected to the thermal action of hot gases at a temperature ranging from 200° to 500° C. and, finally, the product granules are cooled within a particular zone, under agitation, having an average temperature ranging from 42° to 65° C.

The technique immediately above-described provides an improved product. Its appearance and whiteness are better, and its concentration is decreased. Also, its compatibility is better with non-ionic surface active agents. Dusting and speed of dissolution too are significantly improved.

On the other hand, its apparent density is lower and grain hardness is weaker.

It has also been proposed to provide the sodium metasilicate as a pentahydrated sodium metasilicate, shaped as spheres or particulates. Usually, such a product is obtained from a sodium metasilicate solution having a molar ratio of $SiO_2/Na_2O$ which is equal to 1, concentrating such solution to stoichiometric proportions, thence inducing crystallization by cooling on a cooled band and, ultimately, granulation via fluidized bed or turning drum.

The products are obtained by crystallization from solution, and thence by purification, e.g., through filtration. Hence, this is one of the advantages flowing from this type of product, where it can be made in a form which is more pure.

Pentahydrated sodium metasilicate displays a better behavior upon dissolution thereof. For example, it manifests a diluted and "stabilized" form of metasilicate; hence, it becomes less caustic than its anhydrous counterparts.

The resistance of such products to binding by increasing hygroscopicity improves, because same require less water. Also, such products display greater compatibility with non-ionic surfactants.

However, they also manifest many disadvantages. For example, the color of pentahydrated sodium metasilicate does not attain values on the same order as those of granular anhydrous sodium metasilicate, which is much whiter. Subsequently, in the detergent composition itself, heterogeneity of color is an inevitable result, and detracts from the appearance thereof.

Moreover, the apparent density thereof is much less than that of anhydrous sodium metasilicate, given equal grain porosity and average diameter. The amount of water in the pentahydrated sodium metasilicate is significant (42.5%); hence, use thereof results in too great a dilution of the dishwashing formulae and a corresponding reduction in effectiveness. In the event of increased temperature, the risks of binding by partial fusion are great.

Finally, compatibility is bad between pentahydrated sodium metasilicate and active chlorine-releasing additives.

From the foregoing, it is apparent that it is difficult to balance the requirements of the raw material providing the sodium metasilicate, on the one hand, which must satisfy certain economic objectives which mandate a concentrated, effective product, with, on the other hand, the requirements of harmlessness and non-corrosiveness with regard to the user.

SUMMARY OF THE INVENTION

Accordingly, a major object of the present invention is the provision of novel sodium metasilicate granules or particulates comprised of anhydrous sodium metasilicate and pentahydrated sodium metasilicate, characterized by the fact that same comprise an inner core of anhydrous sodium metasilicate enveloped within a peripheral or outer layer of pentahydrated sodium metasilicate, and that the amount of water transformed into or comprising the pentahydrated sodium metasilicate constitutes at least 10% by weight of the final product, usually from 10 to about 25% by weight thereof, and advantageously from 10 to about 20% by weight thereof.

Briefly, the particulates according to the invention are advantageously comprised of the following:

| (i) | Sodium metasilicate, $Na_2SiO_3$ | 73–88% |
| --- | --- | --- |
| (ii) | Water | at least 10% |
| (iii) | Impurities | <2% |

BRIEF DESCRIPTION OF THE DRAWING

The FIGURE of Drawing is a schematic diagrammatical representation of apparatus suited to carry out the process according to the invention.

DETAILED DESCRIPTION OF THE INVENTION

More particularly according to this invention, the water content of the subject granules preferably ranges from about 12 to about 18% by weight.

And the impurities comprising same which emanate from the raw materials are typically sodium carbonate and iron oxide.

The physical characteristics of such granulates are:

| (1) Apparent volume (mass), in $g/cm^3$ | 1.05–1.20 |
| --- | --- |
| (2) Average diameter, in mm | 0.55–0.60 |
| (3) % of granules greater than 1 mm | maximum of 15% |
| (4) % of granules smaller than 0.25 mm | maximum of 1% |

Definitions and methods of determination of such characteristics are reported in the examples to follow.

Due to the characteristics of the components comprising same, the sodium metasilicate granules display the following properties:
  (a) High apparent density;
  (b) Excellent behavior in hot atmosphere and in damp atmosphere; and
  (c) Excellent resistance to attrition.

When utilized in detergency applications, the subject particulates behave extremely well in the presence of chlorine-releasing additives, non-ionic surface active agents, fragrances, and like adjuvants.

Upon incorporation into detergent compositions for dishwashers, they dissolve quickly and the amount of undissolved product upon completion of a given wash cycle is quite small.

The subject particulates are readily prepared via convenient manufacturing technique.

Thus, the sodium metasilicate granules according to the invention are facilely prepared by:

(i) in an initial zone of granulation, introducing anhydrous sodium metasilicate and a sodium metasilicate liquor;

(ii) effecting intimate contact between the solid and liquid phases by atomizing the liquid phase onto the surface of the particles which comprise the solid phase; and (iii) in downstream zone(s) of maturation or aging, treating the granules with a gaseous current or countercurrent as to enable same to retain/attain a water content of at least 10% by weight, preferably from 10 to 25% by weight, and to initiate the superficial formation of pentahydrated sodium metasilicate.

The granules according to the invention are prepared from anhydrous sodium metasilicate. Anhydrous sodium metasilicate is a metasilicate having the formula $Na_2SiO_3$ which includes at most 5% by weight of water.

According to the invention, any anhydrous sodium metasilicate that is commercially available can be utilized. In particular, anhydrous sodium metasilicate can be used which is obtained by the method entailing melting together the required raw materials, including anhydrous sodium carbonate and purified sand, at a high temperature (1,200°-1,300° C.), cooling the resultant product, and thence permitting same to crystallize into a mass which is then crushed, ground and then sifted to the desired granulometry. In view of the fact that the impurities present in the reagents are also present in the mass to be crystallized, a sand should be utilized which has the highest degree of purity, or less than 0.4% of metal oxides, primarily iron and aluminum oxides and preferably less than 0.1% of said oxides.

With respect to the granulometry of the anhydrous sodium metasilicate, same is not critical and will be selected consistent with the desired granulometry of the final product.

Typically, an anhydrous sodium metasilicate is used having particle sizes ranging from 0.05 to 0.80 mm.

The liquid phase introduced into the first zone is comprised, as aforementioned, of a sodium metasilicate liquor obtained, for example, by dissolving anhydrous sodium metasilicate or by treating a silicate solution having a molar ratio of $SiO_2/Na_2O$ in excess of 1, with caustic soda, such as to reduce this ratio to 1. A liquor can also be used emanating from the direct attack of soda upon sand.

Preferably, the liquor is prepared by dissolving anhydrous sodium metasilicate in water, under stirring, at a temperature ranging from 70° to 90° C., preferably at about 80° C.

The sodium metasilicate liquor is prepared such that it has a dry solids content of 30 to 58%, preferably ranging from 40 to 50%.

The ponderal ratio between the dry solids content of the sodium metasilicate liquor and the initial sodium metasilicate advantageously ranges from 0.042 to 0.28, preferably from 0.08 to 0.16.

The initial step in the preparative method involves granulating the anhydrous sodium metasilicate. To this end, the sodium metasilicate liquor is pulverized or atomized vertically onto anhydrous sodium metasilicate particles maintained under stirring, in the configuration of a rolling bed.

The establishment of a rolling bed of particles is ensured by rotation of a turning drum.

The linear speed of rotation of the drum ranges from 0.08 m/s to 1.5 m/s, preferably from 0.3 to 0.8 m/s.

The rates of feed which are adapted to the size of the particular drum respectively vary, in the case of the anhydrous sodium metasilicate, from 2,000 to 3,000 kg/hour, and, in the case of the sodium metasilicate liquor, from 1,000 to 1,500 kg/hour.

The residence time of the particles in the granulation zone ranges from 5 to 30 minutes, preferably about 15 minutes.

The temperature in the granulation zone constitutes a balance temperature established by the action of several hot streams. The hydration and crystallization of the sodium metasilicate are exothermal, and, since the sodium metasilicate liquor is prepared hot, it is therefore necessary to sweep the granulation zone with a gaseous current, the temperature of which being lower than the temperature of the particulates which result.

The sweep can be established by means of a gaseous current, for example, of air or nitrogen at ambient temperature (from 5° to 30° C.), either cocurrently or countercurrently with the solid mass. Preferably, the cocurrent technique is employed, to avoid any scattering of the anhydrous sodium metasilicate.

The temperature of the granules at the outlet of the granulation zone must be less than 50° C., and may conveniently vary from about ambient temperature to 50° C.

At the outlet of the granulation zone, the pentahydrated sodium metasilicate has already crystallized at the surface, but it is preferable to complete the crystallization thereof by means of a maturing or aging step which entails cooling the obtained product, thus effecting complete crystallization and ensuring the stability of the product granules.

The cooling is effected with a gaseous current, for example, of air or nitrogen, preferably directed countercurrently to the mass to be cooled.

The temperature of the granules obtained at the outlet of the zone of maturation or aging must be lower than about 35° C. such that they can easily be handled.

The granules are stirred to ensure effective thermal exchange. Stirring can be ensured by moving the granules maintained in the configuration of a falling bed or in the configuration of a fluidized bed.

The linear speed of rotation of the drum advantageously ranges from 0.08 m/s to 0.5 m/s, preferably from 0.2 m/s to 0.4 m/s.

The residence time of the granules in the zone of maturation advantageously ranges from 30 to 60 mintues depending upon the type of apparatus employed.

Then, the particulates are removed, and sifted to the desired granulometry, advantageously ranging from about 0.4 to 1.25 mm.

Finally, in a preferred embodiment of the invention, a recycling is effected of the fine particles that have been separated in the sifting operation and the dusts which were recovered through filtering of the gaseous stream, at the outlet of the granulation zone. Advantageously, the amount of recycling constitutes 20 to 40% of the weight of the final product.

One of the most important advantages of recycling is that it ensures a stable and steady operation of the process. By recycling the fine particles, or fines, one can partially compensate for any granulometry irregularities in the anhydrous sodium metasilicate because it is difficult to obtain same having a completely regular granulometry.

The process according to the invention can be carried out in readily available apparatus.

For the first stage, any suitable device for establishing a rolling bed of particles can be employed. The most adequate device is a rotating drum either having smooth walls or provided with blades or vanes, the height of which being less than that of the height of the bed of product.

With respect to the aging or maturing step, any suitable means is used which establishes an upwardly and downwardly moving mass of a powdery material and which also ensures good contact between a solid mass to be cooled and a current of cooling gas. Practically speaking, a rotating drum equipped with lifting blades is conveniently used, the blades comprising same effecting a lifting of a portion of the bed of granular matter which is resting inside the drum when the latter turns and which permits the granules to fall like rain by forming screens which constitute most of the volume of said drum, extending vertically and lengthwise through the drum and moving therethrough, from one side to another.

A similar system can also be used, comprised of a fluidized bed equipped with means which enable the establishment of the fluidized bed, most often, air.

It will be appreciated that the two granulation and maturation operations can be carried out in but a single drum, but it is preferable to use two drums and a single gaseous flow stream. Indeed, in the first zone, it is preferred to charge the gaseous current cocurrently with the material in order to avoid scattering of the anhydrous sodium metasilicate. On the other hand, it is preferable to establish, at least in part within the maturation or aging zone, a gaseous countercurrent such as to ensure greater and faster cooling.

Figure 1:
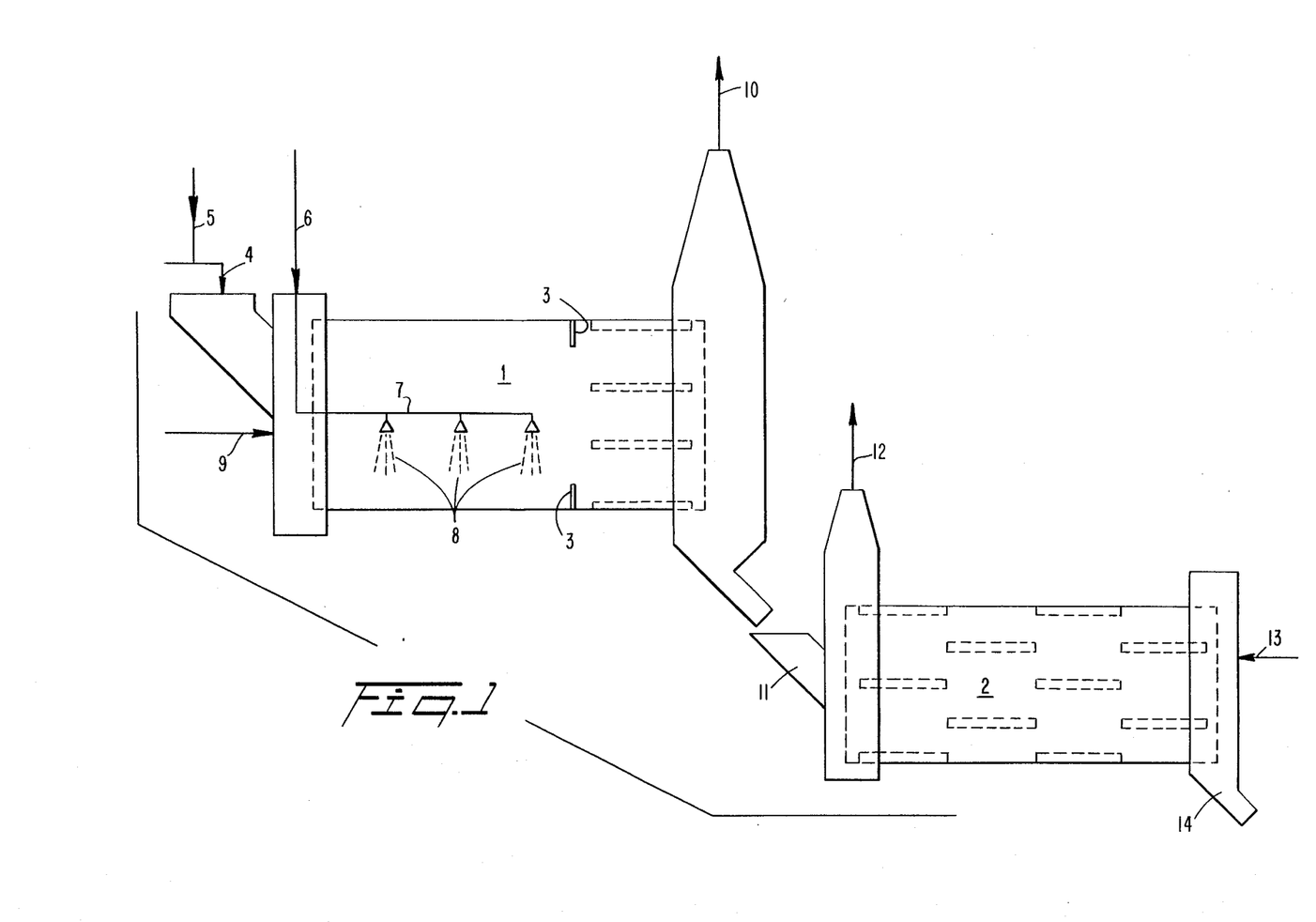

One apparatus suitable for carrying out the process according to the invention is illustrated in the accompanying FIGURE of Drawing.

Said FIGURE of Drawing depicts a diagrammatical, cross-sectional side view of apparatus suitable for carrying out the process according to the invention.

Such apparatus is comprised of two drums 1 and 2 which are hollow and longitudinally extended in shape. Each drum rotates and is mounted such that its axis is slightly tilted with respect to the horizontal, for example, by about 5°, and is equipped with means to rotate the drum at the desired speed (said means being per se known and not shown in the FIGURE of Drawing).

Each drum has a diaphragm at its inlet and outlet, also not shown, shaped like a ring, the purpose of which being to retain in the drum the material introduced therein.

Also with reference to said FIGURE of Drawing, the drum 1 is divided into 2 compartments by means of the diaphragm 3. The first compartment comprises zone of granulation and the second compartment comprises the zone of initial maturation or aging. The height of the diaphragm 3 determines the height of the product bed.

A channel inlet 4 which tilts downwardly is used to feed the anhydrous sodium metasilicate into the lower portion of one end area of drum 1.

The inlet end of the drum 1 is provided with smooth walls. The rotation of the drum 1 effects establishment of a rolling bed of product which enables the particles to agglutinate.

The sodium metasilicate liquid is previously prepared inside a vat equipped with a heating device and with a stirrer driven by a motor in standard fashion. It is conveyed under pressure generated by a pump or other means, such as a stream of compressed air, and its flow is controlled by an automatic valve.

The liquid is conveyed via the feed channel 6 and is sprayed onto the agitated anhydrous sodium metasilicate by means of mechanical spray nozzles 8 mounted onto an atomization ramp 7. The liquid can also be atomized by means of an auxiliary fluid (air) or a mixed system.

Since the drum is slightly tilted, the sodium metasilicate is conveyed to and within the second compartment of the drum 1, said second compartment being provided with a number of lifting blades.

The gaseous current 9 is charged through an orifice provided in the diaphragm at the inlet end of the drum 1.

At the outlet end of the drum 1 is provided a collector 10 which is designed to vent heated gases emanating from the drum 1.

Gas flow is ensured through suction by means of an extraction fan disposed at the outlet of the collector 10.

A filter placed in front thereof enables retention of the dusts that are contained in the gaseous stream.

The granules are charged from the first to the second drum by simple gravity through the conduit channel 11, or by means of appropriate conveyor suited to the product.

The granules or particles then traverse a second collector 12 and fall within the bottom section of the second drum 2. The collector 12 is used to vent gases from drum 2. At the outlet of the collector 12 are provided a filter and an extracting fan.

The drum 2 includes at its outlet end an orifice provided in the diaphragm which permits charging of a gaseous stream 13 countercurrently to the flow of the moving material, because it is sucked into the system by the fan provided at the outlet of the collector 12.

The drum 2 is also provided with outlet means 14 for the granules.

The granules which exit the second drum are sifted on any suitable sifter (vibratory sifter, rotary sifter, or any other type) which enables elimination of the large particles which can then be converted to the desired granulometry through grinding, and to separate the fine particles which can be recycled to the inlet end of the drum 1 via the conduit 5.

There likewise can be recycled any dust which has been retained on the various filters located at the outlets of the collectors 10 and 12.

Ultimately provided are the particulates according to the invention having those improved properties more fully discussed, infra.

The sodium metasilicate granules of the invention are advantageously incorporated into detergent compositions destined for dishwasher applications.

The proportion by weight of the particulates of the invention in said detergent compositions advantageously ranges from 20 to 70%.

Representative such compositions comprise:

(i) 20 to 70% by weight of the granular particulates of sodium metasilicate according to this invention;

(ii) 10 to 70% by weight of an alkali metal phosphate or polyphosphate;

(iii) 1 to 30% by weight of one or more water soluble mineral salts;

(iv) 0.2 to 3% by weight of a non-ionic surfactant;

(v) 0.2 to 5% by weight of a chlorine-releasing bleaching agent;

(vi) 0.2 to 5% by weight of typical detergent additives, such as corrosion inhibitors, anti-foaming agents, anti-binding agents, perfumes and fragrances, colorants, and the like; and (vii) ultimately, 0 to 50% by weight of a natural or synthetic aluminosilicate.

As the alkali metal phosphate or polyphosphate, exemplary are sodium orthophosphate, sodium pyrophosphate, potassium pyrophosphate, and sodium triphosphate. Preferably, one employs the latter.

Exemplary of the soluble mineral salts, representative are sodium carbonate, sodium sulfate, sodium borate, sodium chloride, sodium bicarbonate or potassium bicarbonate.

The non-ionic surface active agent must have good wetting capability, but cannot be too foamy. Representative non-ionic surface active agents are:

(1) Polyoxyethylene alkylphenols, for example, condensation products of 1 to 6 moles of ethylene oxide per mole of an alkylphenol, the alkyl radical thereof being linear or branched chain and containing 6 to 12 carbon atoms. Especially representative is nonylphenol condensed with 2 moles of ethylene oxide per each mole of the phenol; dodecylphenol condensed with 2 to 6 moles of ethylene oxide per each mole of the phenol.

(2) Aliphatic polyoxyethylene alcohols prepared by condensing 2 to 6 moles of ethylene oxide with one mole of a fatty linear or branched chain alcohol containing from 8 to 22 carbon atoms, for example, condensing 2 to 4 moles of ethylene oxide with 1 mole of the $C_{18}$ alcohol.

(3) Polyoxyethylene and polyoxypropylene alcohols. Especially representative are those products marketed under the trademark PLURAFAC which are primary linear polyoxyethylene and polyoxypropylene alcohols.

(4) Polyoxyethylene and polyoxypropylene compounds; one example of such type of surface active agent is the well-known product marketed as "PLURONICS". This product is obtained by adding sequentially propylene oxide and ethylene oxide to a low molecular weight compound comprised of an active hydrogen atom, such as propylene glycol, for example. Especially representative is a surfactant comprising 10% polyoxyethylene in relation to the weight of polyoxypropylene, and having a molecular weight of 1,750.

The chlorine-releasing compound is advantageously sodium or potassium dichloroisocyanurate, either anhydrous or hydrated, dichlorodimethylhydantoin, dichlorinated glycolurile, chloramine T.

Insoluble crystallized sodium aluminosilicates are also suited for incorporation into the detergent compositions intended. Same are adapted to exchange sodium ions for calcium and magnesium ions that are present in the wash waters. Suitable are natural as well as synthetic aluminosilicates, especially the zeolites of type 4A.

During the formulation of appropriate detergent compositions, the granules of the invention are conveniently introduced at any point in the operation, but there is a preferred order for introduction of the constituents.

The operation is typically carried out in a mixer (of a type that rotates continuously or alternately). First, one charges the alkali metal phosphate or polyphosphate. Then, the non-ionic surface active agent is sprayed onto the phosphate. Next, the other constituents of the composition are added, including the sodium metasilicate granules of the invention, and, lastly, the chlorine-releasing compound is added.

The granules of the invention are perfectly well suited, as aforementioned, for incorporation into detergent compositions destined for dishwasher applications. Their use is not restricted to such applications and they can advantageously be used in all other areas of use for sodium metasilicate: household detergency in laundry powders, detergency for communities, industrial detergency, especially in the food industries (cleaning bottles), in the metalworking industries (removing grease from ferrous metals and aluminum), in textile industries (especially in hydrogen peroxide bleaching baths).

In order to further illustrate the present invention and the advantages thereof, the following specific examples are given, it being understood that same are intended only as illustrative and in nowise limitative.

In said examples to follow, the subject granules/particulates were subjected to tests designed to highlight the physio-chemical properties thereof and their cleaning effectiveness when incorporated into dishwashing detergents. Also in said examples to follow, all percentages are by weight.

EXAMPLES (I) Preparation of the granules of the invention:

The granules of the invention were prepared from anhydrous sodium metasilicate marketed under the trademark Simet AP and having the following characteristics:

| (a) Physical properties: | (i) | in powder form; |
| | (ii) | apparent volume, 1.2; |
| (b) Chemical properties: | (i) | $SiO_2$ on dry basis: 46.6%; |
| | (ii) | $Na_2O$ in dry basis: 50.9%; |
| | (iii) | $CO_2$ on dry basis: 2.0% |
| | (iv) | $H_2O$: 0.2%; |
| | (v) | $Fe_2O_3$: maximum of 0.05%; |
| | (vi) | insoluble: maximum of 0.1%; |
| (c) Granulometry: | (i) | average diameter, 0.16 mm; |
| | (ii) | 7% refuse, on 0.63 mm sifter. |

The granules according to the invention were prepared from the aforesaid anhydrous sodium metasilicate in the apparatus shown in the FIGURE of Drawing, the two rotating drums 1 and 2 thereof having the following specifications:

| | Drum 1 | Drum 2 |
| --- | --- | --- |
| (a) Length in m: | 8.00 | 8.00 |
| (b) Diameter in m: | 2.50 | 2.50 |
| (c) Speed of rotation: | 5.7 rpm | 1.6 rpm |
| | 0.75 m/s | 0.21 m/s |

Drum 1 was divided by diaphragm 3 into two compartments: the first compartment was 5.3 m in length and defined the granulation zone, and the second compartment was 2.7 m in length and defined the zone of initial maturation or aging. The drum 1 had smooth walls in the first compartment, and was fitted with lifting blades in the second compartment thereof.

Anhydrous sodium metasilicate was charged into the drum 1 through the feed channel 4, with the recycle conduit 5 being in communicating relationship therewith, for the recycle of fines.

The sodium metasilicate liquid was introduced through the feed conduit 6 and sprayed onto the anhydrous metasilicate by means of the spray nozzles 8 and the atomization ramp 7.

Air, via line 9, was cocurrently introduced with the material inside drum 1 and exited through the collector 10, at the outlet of which it was sucked by an extraction fan after passing through the filter.

The product exiting the drum 1 fell by gravity through the feed channel 11 into the drum 2 which was provided with lifting blades.

Same was then countercurrently treated with air at ambient temperature, the air having been introduced via line 13 and exited through the collector 12, at the outlet of which it was sucked by an extraction fan after passing through a filter.

The granules were collected at outlet 14 and then sifted.

The conditions of the treatment are summarized in the Table I which follows:

(II) Physio-chemical properties of the granules of the invention:

Based on a series of measurements and tests, highlighted below are the physiochemical properties of the granules of the invention and their adaptability for incorporation into detergent compositions destined for dishwasher applications.

The granules described in Examples 1 through 3 were studied in particular.

For the sake of comparison, tests were also conducted with commercial products which were:

(a) An anhydrous sodium metasilicate (test A) which is marketed by the RHONE-POULENC Company as Simet AS. Same was obtained through fusion at about 1,200° C. of a mixture of sand and sodium carbonate. The mass which was obtained was crushed after it was cooled, and was then ground and sifted. Its chemical characteristics were as follows (the percentages are by weight):

| (i) | $SiO_2$ on dry basis | 46.6; |
| (ii) | $Na_2O$ on dry basis | 50.9; |
| (iii) | $CO_2$ on dry basis | 2.0; |
| (iv) | $H_2O$ | 0.2; |
| (v) | $Fe_2O_3$ | 0.05 maximum; and |

TABLE I

| | Sodium metasilicate liquid | | Anhydrous sodium metasilicate Flow (Kg/hr) | Fines recycled via line 5 Flow (Kg/hr) | Gas temperature in granulation zone | | Gas temperature in maturation zone | | Product temperature | |
|---|---|---|---|---|---|---|---|---|---|---|
| EXAMPLES | Flow (Kg/hr) | Dry extract (%) | | | Inlet 9 | Outlet | Inlet 13 | Outlet | Outlet of granulation zone 11 | Outlet of maturation zone 14 |
| 1 | 1070 | 46.8 | 2,000 | 1,000 | 27 | 46 | 27 | 36 | 44 | 35 |
| 2 | 1100 | 42.2 | 3,000 | 1,000 | 20 | 38 | 20 | 32 | 30 | 32 |
| 3 | 1700 | 48.5 | 2,500 | 1,500 | 14 | 48 | 14 | 31 | 50 | 27 |
| 4 | 1200 | 44.0 | 3,000 | 1,500 | 23 | 46 | 23 | 34 | 44 | 30 |
| 5 | 1330 | 48.3 | 2,500 | 2,000 | 7 | 50 | 7 | 34 | 50 | 22 |
| 6 | 2240 | 41 | 2,500 | 1,500 | 11 | 49 | 11 | 35 | 50 | 37 |

The characteristics and properties of the granules which were obtained and sifted to particle sizes ranging from 0.4 mm to 1.25 mm are reported in the following Table II.

Water content was determined by weighing the product before and after calcination at 550° C.

The apparent volume was determined by measuring the volume of a given mass of product inside a scaled tube, without stacking.

Granulometry was determined by passing the product through standardized AFNOR sifters. The average diameter was determined as the diameter where 50% by weight of the particles had a diameter which was higher or lower than the average diameter.

| (vi) | Insolubles | 0.1 maximum |

(b) A granulated sodium metasilicate having a low water content (test B) marketed under the trademark Simet AG, obtained by a method of granulation which is described in French patent application No. 77/29001, published under No. 2,403,974 and U.S. Pat. No. 4,253,849, and having the following chemical characteristics:

| (i) | $SiO_2$ on dry basis | 46.8; |
| (ii) | $Na_2O$ on dry basis | 50.7; |

TABLE II

| | Composition of the granules | | | | Granulometry of accumulated refuse at | | |
|---|---|---|---|---|---|---|---|
| EXAMPLES | Water Content (%) | Anydrous sodium metasilicate (%) | Sodium metasilicate pentahydrate (%) | Apparent volume (g/cm³) | 0.25 mm | 1 mm | Average diameter (in mm) |
| 1 | 16.6 | 61 | 39 | 1.13 | 99.5 | 2 | 0.55 |
| 2 | 10 | 76.5 | 23.5 | 1.17 | 99.5 | 3 | 0.59 |
| 3 | 20 | 53.0 | 47.0 | 1.10 | 99.5 | 4 | 0.60 |
| 4 | 11.0 | 74.1 | 25.9 | 1.20 | 99.3 | 3 | 0.55 |
| 5 | 14.0 | 67.1 | 32.9 | 1.08 | 99.2 | 4 | 0.58 |
| 6 | 25 | 41.2 | 58.8 | 1.05 | 99.7 | 4 | 0.68 |

-continued

|       |                  |                   |
|-------|------------------|-------------------|
| (iii) | $CO_2$ on dry basis | 2.0;              |
| (iv)  | $H_2O$           | 3.0;              |
| (v)   | $Fe_2O_3$        | 0.05 maximum; and |
| (vi)  | Insolubles       | 0.1 maximum.      |

(c) A granulated pentahydrated sodium metasilicate (test C) marketed under the trademark Simet 5 GS, prepared by granulating a sodium metasilicate solution, then cooling same, the chemical characteristics of which being as follows:

|       |                  |                   |
|-------|------------------|-------------------|
| (i)   | $SiO_2$ on dry basis | 27.9;         |
| (ii)  | $Na_2O$ on dry basis | 28.4;         |
| (iii) | $CO_2$ on dry basis  | 0.7;          |
| (iv)  | $H_2O$           | 42.0;             |
| (v)   | $Fe_2O_3$        | 0.05 maximum; and |
| (vi)  | Insolubles       | 0.1 maximum.      |

Hereafter are reported the chemical characteristics of the granules according to the invention:

(d) Granular sodium metasilicate having a water content of 16.6% (Example 1):

|       |                          |                   |
|-------|--------------------------|-------------------|
| (i)   | $SiO_2$ on hydrated basis | 39.9;            |
| (ii)  | $Na_2O$ on hydrated basis | 41.3;            |
| (iii) | $CO_2$ on hydrated basis  | 2.0;             |
| (iv)  | $H_2O$                   | 16.6;             |
| (v)   | $Fe_2O_3$                | 0.05 maximum; and |
| (vi)  | Insolubles               | 0.1 maximum.      |

(e) Granular sodium metasilicate having a water content of 10.0% (Example 2):

|       |                          |                   |
|-------|--------------------------|-------------------|
| (i)   | $SiO_2$ on hydrated basis | 43.2;            |
| (ii)  | $Na_2O$ on hydrated basis | 44.6;            |
| (iii) | $CO_2$ on hydrated basis  | 2;               |
| (iv)  | $H_2O$                   | 10.0;             |
| (v)   | $Fe_2O_3$                | 0.05 maximum; and |
| (vi)  | Insolubles               | 0.1 maximum.      |

(f) Granular sodium metasilicate having a water content of 20.0% (Example 3):

|       |                          |                   |
|-------|--------------------------|-------------------|
| (i)   | $SiO_2$ on hydrated basis | 38.3;            |
| (ii)  | $Na_2O$ on hydrated basis | 39.5;            |
| (iii) | $CO_2$ on hydrated basis  | 2;               |
| (iv)  | $H_2O$                   | 20.0;             |
| (v)   | $Fe_2O_3$                | 0.05 maximum; and |
| (vi)  | Insolubles               | 0.1 maximum.      |

The parameters investigated concerning the sodium metasilicates, as above-outlined, are related to the five requirements discussed during the introduction hereto.
(1) Appearance:
  (i) Color;
  (ii) Shape of grains;
  (iii) Granulometry;
  (iv) Resistance to attrition (grain hardness).
(2) Concentration:
  (i) Apparent volume;
  (ii) Water content.
(3) Non-aggressiveness:
  (i) Water content;
  (ii) Dusting;
  (iii) Resistance to attrition (grain hardness);
  (iv) Grain coating.
(4) Stability and compatibility:
  (i) Resistance to binding;
  (ii) Compatibility with non-ionic surface active agents;
  (iii) Compatibility with chlorine-releasing compounds;
(5) Availability for dishwasher applications:
  (i) Kinetics of dissolution;
  (ii) Rate of dissolution.

Prior to detailed account of the results obtained from the various products tested, the methods employed to make such determinations of the various parameters will now be described:
(1) Appearance:
  (i) Color:

One determines the color of a product to be tested with a GARDNER XL 805 reflectometer which operates under trichromatic coordinates.

The principle behind the method is to measure the amount of light which is reflected by the product under three wave lengths that correspond to three monochromatic colors.

The measurement takes into account luminance and colored tints or shades, distribution and granulometric size characteristics of the product to be tested.

The result is expressed as the L, a and b coordinates.
L is product luminance and it excludes the issue of colored tints. The luminance scale is as follows:
  O = pitch black and 100 = pure white.
a and b indicate colors:
  a positive corresponds to a red tint;
  a negative corresponds to a green tint;
  b positive corresponds to a yellow tint;
  b negative corresponds to a blue tint;
  a and b close to 0 correspond to a colorless product.
  (ii) Shape of the grains:

Same is characterized by investigation using a scanning electron microscope at 100 magnification.
  (iii) Granulometry:

Same is determined by passage through a series of standardized AFNOR sifters and then by weighing each granulometric fraction.

It is expressed in terms of average diameter which is defined as a diameter such that 50% by weight of the particles have a diameter which is either greater or lower than the average diameter.
  (iv) Resistance to attrition (grain hardness):

The product to be tested is subjected to a specific mechanical treatment, and then granulometric analysis is conducted thereon to enable evaluation of any destruction of the test particles.

The mechanical treatment consists of placing 200 g of the product to be tested inside a 2-liter glass flask and subjecting it to a rotation of 40 revolutions per minute for 1 hour on a PROLABO rotating flask stirrer.

After this destruction test, there is measured the percentage of fine particles which has passed through two standardized AFNOR sifters, the mesh openings of which equal 0.5 mm and 0.25 mm, and the results are compared with those obtained on the material prior to the test.

Two such tests are conducted upon each product.
(2) Concentration:
  (i) Apparent volume:

Similarly determined according to the NF T 73-405 standard which enables the determination of the apparent volume of cleaning powders.

The volume of a given mass of the product is measured inside a scaled tube following its free fall therein and without stacking of the product.

Two such determinations are conducted upon each product.

(ii) Water content:

Water content is determined by weighing the product before and after calcination at 550° C.

(3) Non-aggressiveness:

(i) Water content:

See (2)(ii).

(ii) Dusting:

Evaluating dusting for a given product entails granulometric measurement of the fraction of fine particles responsible for the dusting.

A granulometric selection method through elutriation is employed in order to quantify the dusting.

The product as such is introduced within a fluidization device as described in the French standard P 15-443 where a current of dry nitrogen (0.6 bar) selectively drives the extremely fine particles which are responsible for the dusting.

Such particles are trapped at the outlet thereof within a flask which contains water, and wherein same dissolve, whereupon the amount of such particles is quantitatively measured by conventional alkalimetry.

The instrumention employed includes:

a cylindrical/conical vase which is designed to accommodate the product to be tested with the same inner diameter as a separator pipe to which it is hermetically connected by creating a continuous inner wall therewith.

a vertical separator pipe which is agitated by vertical vibrating.

a nitrogen intake comprised of an elbow-shaped manifold above the vase and terminating with a nozzle at its inner portion.

a dust collector affixed atop the pipe having a flexible coupling.

The mode of operation of such device is as follows:

5 g of the product to be tested are placed at the bottom of the cylindrical/conical vase;

The collector which contains 200 cm³ of distilled water is connected to the vertical separator pipe having a flexible coupling;

As the vibrator is in operation, a nitrogen flow is initiated under 600 mm of mercury pressure (the operation lasts for 15 minutes);

The alkalinity imparted by the dust is determined using N/50 sulfuric acid in the presence of phenolphthalein (the value C1);

Parallel to this, the alkalinity of the basic product is determined by dissolving exactly 1 g of product in 200 cm³ of water, and with 1N sulfuric acid, in the presence of phenolphthalein (the value C2);

The dusting is expressed in p.p.m. in relation to the product, such that:

$$\text{Dusting} = \frac{C1}{C2} \times 4,000$$

Two such determinations are conducted for each evaluation, from which the mean is established.

(iii) Resistance to attrition (grain hardness):

See (1)(iv).

(iv) Grain Coating:

By examination under the scanning electron microscope, the distribution of the pentahydrated sodium metasilicate in the product granules is determined.

(4) Stability of the granules and compatibility thereof with the other constituents of a detergent composition:

(i) Resistance to binding:

The tests are conducted in hot or damp atmosphere.

Resistance to binding in hot atmosphere. The product is maintained for 2 hours, in a sealed flask, inside a device at 40° C.

Resistance to binding in damp atmosphere. The product is maintained for 2 hours in an atmosphere having 90% relative humidity, in an open crystallizer, at ambient temperature (between 18° and 25° C.).

In both instances, the results will be as follows:

good: product with no apparent binding;

poor: partial binding or total agglomeration.

(ii) Compatibility with non-ionic surface active agents:

The compatibility between the product to be tested and non-ionic surface active agents is determined by measuring the development of color in the mixture.

A mixture is prepared which contains 98% by weight of product to be tested and 2% by weight of the non-ionic surface active agent, a nonylphenol condensed with 9 moles of ethylene oxide (Cemulsol N.P. 9). The mixture is manually stirred until good homogeneity results.

The initial color of the mixture is measured with a GARDNER reflectometer as previously stated.

The aging of the mixture is accelerated by storing it in a sealed flask placed within a cabinet at a temperature of 55° C. for 24 hours.

The color of the mixture is then measured after aging.

A computer associated with the testing device enables committing the initial data to memory, to record the data after aging, and to compute the difference in color ($\Delta E$) which exists between the two sets of data.

The compatibility level between the product to be tested and the non-ionic surface active agent is expressed as the value of the change in color and the following scale provides a meaningful frame of reference.

| Value of $\Delta E$ | Compatibility level product to be tested/non-ionic surface active agent |
| --- | --- |
| $\Delta E < 1$ | Excellent |
| $1 < \Delta E < 2$ | Good |
| $\Delta E > 2$ | Poor |

(iii) Compatibility with chlorine-releasing compounds:

The amount of residual chlorine is determined after an accelerated storage test.

A test mixture is prepared containing 98% by weight of the product to be tested and 2% by weight of the chlorine-releasing compound, sodium dichloroisocyanurate.

The product is maintained for 10 days, within a sealed flask, also within an enclosure at a temperature of 40° C.

Upon completion of the storage period, the residual chlorine is determined through iodometry in an acid medium.

(5) Availability for dishwasher applications:

This test is universal and it integrates the influence of:

the ability of evacuate the supply cup;

the geometric characteristics of the dishwasher; and the ability to dissolve of the product proper.

The test is conducted using a MIELE G 500 household dishwashing machine which is equipped such as to enable the rapid withdrawing of a sample of the cleaning bath, every 30 seconds from the opening of the cup, without opening the door.

Concentration at each sampling is evaluated by measuring conductivity using a TACUSSEL conductometer.

A curve is then plotted: concentration (conductivity) in relation to time and the result is expressed by the two parameters:

kinetics of dissolution: time required to dissolve 65% of the amount of product that was initially introduced.

rate of dissolution: percentage of undissolved product upon completion of the "wash" cycle in a given dishwashing operation.

The determinations which were obtained employing the various test sodium metasilicates are reported in the Table III which follows:

In consideration of the test results above-outlined, it will be seen that the granular particulates according to the invention exhibit the following marked advantages:

In relation to the anhydrous sodium metasilicates:

The scanning electron microscope analysis reveals the presence of an outer superficial thin layer or sheath which is distinct from the core in that it is comprised of pentahydrated sodium metasilicate, a fact which is confirmed by differential thermal analysis (endotherm peak at 72° C.).

One can attribute its aforenoted good compatibility with the other constituents of detergent compositions to this sheath layer, as well as resistance to binding under damp atmosphere, good speed of dissolution, etc., namely, all of the desirable features to date ascribable to the anhydrous products. It too should be appreciated that the granular sheath/core particulates according to the invention are less aggressive, caustic or corrosive vis-a-vis their environment and their kinetics and rates of dissolution are markedly improved.

In relation to the pentahydrated sodium metasilicates:

Since the granular particulates of the invention are partially hydrated, they remain, however, more con-

TABLE III

| Parameters evaluated | Measurements and tests | TEST A Ground anhydrous sodium metasilicate | TEST B Granulated anhydrous sodium metasilicate | TEST C Granulated sodium metasilicate pentahydrate | EXAMPLE 1 Granulated sodium metasilicate with a water content of 16.6% | EXAMPLE 2 Granulated sodium metasilicate with a water content of 10.0% | EXAMPLE 3 Granulated sodium metasilicate with a water content of 20.0% | EXAMPLE 4 Granulated sodium metasilicate with a water content of 25% |
|---|---|---|---|---|---|---|---|---|
| (1) APPEARANCE | Color | L = 87.7 a = +0.7 b = +2.56 | L = 91.44 a = +0.13 b = +1.90 | L = 91.6 a = −0.12 b = +2.23 | L = 90.9 a = +0.30 b = +2.12 | L = 92.1 a = +0.53 b = +1.37 | L = 90.5 a = +0.35 b = +2.10 | L = 90.4 a = +0.40 b = +2.15 |
| | Granulometry (average diameter) | 0.80 mm | 0.55–0.60 mm | 0.55–0.60 mm | 0.55–0.60 mm | 0.55–0.60 mm | 0.55–0.60 mm | 0.65–0.75 mm |
| | Shape of grains | Sharp edges | granules obtained through agglomeration in the form of either more or less spherical shapes | | | | | |
| | Resistance to attrition | | | | | | | |
| | 0.5 mm | 1.2% | 1.75% | 0.10% | 0.85% | 1.0% | 0.70% | 0.50% |
| | 0.25 mm | 0.1% | 0.35% | 0.01% | 0.05% | 0.05% | 0.05% | 0.02% |
| (2) CONCENTRATION | Apparent volume | 1.25 | 0.92 | 0.88 | 1.13 | 1.17 | 1.10 | 1.05 |
| | Water content | 0.2% | 3.0% | 42.0% | 16.6% | 10.0% | 20.0% | 25.0% |
| (3) NON-AGGRESSIVENESS | Water content | 0.2% | 3.0% | 42.0% | 16.6% | 10.0% | 20.0% | 25.0% |
| | Dusting (ppm) | 8,000 | 900 | 500 | 600 | 800 | 300 | 250 |
| | Resistance to attrition | | | | | | | |
| | 0.5 mm | 1.2% | 1.75% | 0.10% | 0.85% | 1.0% | 0.70% | 0.50% |
| | 0.25 mm | 0.1% | 0.35% | 0.01% | 0.05% | 0.05% | 0.05% | 0.02% |
| | Coating with sodium metasilicate pentahydrate | no | no | no | yes | yes | yes | yes |
| (4) STABILITY AND COMPATIBILITY | Resistance to binding in hot atmosphere | Good | Good | Poor | Good | Good | Good | Good |
| | Resistance to binding in damp atmosphere | Poor | Poor | Good | Good | Good | Good | Good |
| | Compatibility with non-ionic surface active agents | 20 | 1.17 | <1 | <1 | <1 | <1 | <1 |
| | Compatibility with chlorine-releasing compounds | 95% | 94% | 25% | | 88–90% | | |
| (5) AVAILABILITY FOR DISHWASHERS | Kinetics of dissolution | 5 mn 30 | 3 mn 30 | 0mn 20 | 1 mn 10 | 2 mn 25 | 0mn 50 | 0mn 35 |
| | Rate of dissolution | 24.7 | 20.8 | 20.5 | 18.3 | 20.6 | 17.5 | 15.0 | centrated than the pentahydrated sodium metasilicates and to this phenomenon one can attribute their greater effectiveness in detergency applications. Likewise as regards the compactness thereof, whereby the subject granular particulates manifest a greater apparent volume whereas intrinsically pentahydrated sodium metasilicates cannot be prepared having apparent volumes in excess of 0.90.

Resistance to binding in a hot atmosphere is also better for the granular particulates of the invention.

Compatibility of the particulates of the invention with chlorine-releasing compounds parallels the good results obtained with the anhydrous sodium metasilicates in this respect, and which are much better than the mediocre results obtained when using the pentahydrated sodium metasilicates.

Finally, quite surprisingly, even though the speed of dissolution of the granular particulates of the invention is lower than that of the pentahydrated sodium metasilicates, the granules of the invention are overall more completely dissolved than the known pentahydrates.

With regard to the other properties which have not been specifically mentioned (color, granulometry, shape of grains, grain hardness, and the like), same basically do not differ from those of conventional products, being more affected by the quality and purity of the raw materials and by their method of manufacture than by the constitution of the product.

Next follows an example of incorporation of the granular particulates of the invention in a detergent composition adapted for dishwasher application.

Use of the granules of the invention in detergent compositions for dishwashing machines:

A detergent composition was prepared, into which the granular particulates according to the invention, and as described in Example 1, were incorporated, said composition being formulated as follows:

| (1) | Granulated sodium metasilicate having a water content of 16.6% | 60% |
|---|---|---|
| (2) | Granular sodium triphosphate having a water content of 6% | 30% |
| (3) | Non-ionic surface active agent: PLURAFAC RA 43 (polyoxypropylene and polyoxyethylene alcohol) | 2% |
| (4) | Chlorine-releasing compound: CDB CLEARON (sodium dichloroisocyanurate dihydrate) | 3% |
| (5) | Anhydrous sodium carbonate | 5% |

For purposes of comparison, a conventional detergent composition was prepared as a reference, and into which anhydrous sodium metasilicate and sodium metasilicate pentahydrate were incorporated in amounts such that the water content thereof was identical to that imparted by the granular particulates of the invention, in the composition immediately above. Such reference composition comprised:

| (a) | Ground anhydrous sodium metasilicate (SIMET AS) | 37.4% |
|---|---|---|
| (b) | Sodium metasilicate pentahydrate (SIMET 5GS) | 22.6% |
| (c) | Granulated sodium triphosphate having a water content of 6% | 30% |
| (d) | Non-ionic surface active agent: PLURAFAC RA 43 | 2% |
| (e) | Chlorine-releasing compound: CDB CLEARON | 3% |
| (f) | Anhydrous sodium carbonate | 5% |

The two detergent compositions were formulated in a LODIGE M5G mixer having an overall capacity of 5 liters. The order in which the constituents were introduced was as follows: the sodium triphosphate was introduced and the non-ionic surface active agent was applied thereon, in pulverulent form. Next, the other constituents, including the sodium metasilicates, were added. Lastly, the chlorine-releasing compound was added.

The two detergent compositions thus prepared were granulometrically quite similar.

Said compositions were next packaged in standard consumer packages and stored for two months at ambient temperature, in an ambient air atmosphere of fluctuating relative humidity.

Following this two-month period of storage, the two detergent compositions were examined for the following properties:
Color;
Resistance to binding;
Content of residual chlorine (percentage, expressed in relation to initial amount); and
Effectiveness of washing in a dishwashing machine.

Next follow the results obtained in evaluating the respective compositions for effectiveness of dishwashing.

In order to provide a selective test, hard-to-clean substrates were selected as representative of the test dishware. Same comprised hard aluminum plates which were perfectly flat, and the face surfaces thereof were treated as to convert same to a reproducible test state by alternate immersions of 10 minutes each in an acid bath of 1 liter of hydrochloric acid, $d=1.15$, and then in an aqueous bath having a total volume of 10 liters, rinsing, then immersing the plates for 10 minutes in an alkali bath that contained 10 g/l of pure soda, rinsing, renewed immersion for 2 minutes in the acid bath, then final rinsing.

A stain was next applied thereto comprised of powdered milk, grease and water in the form of a fluid paste with an applicator which enabled coating a thin layer thereon, having a constant thickness (for example, with an applicator of the type used for preparing chromatography plates). The stain was then securely affixed to the test plates by burning same in a ventilated oven at 120° C. for 1 hour.

A group of thirty (30) test plates was thus prepared, and after the stains were affixed, such group was divided by random selection into three sets of ten (10) plates each, it being assumed that the degree and extent of staining were roughly the same in each set.

The first set was washed with pure water (hardness: 33° TH, corresponding to 330 mg of $CaCO_3$ per one liter of water) in a MIELE G 500 dishwasher, short cycle, without drying.

The second set was washed under precisely the same conditions, in the presence of the detergent composition according to the invention.

The third set was washed, again under the same conditions, in the presence of the conventional detergent composition formulated as above as the reference composition.

For each plate in each set, the percentage of stain removal therefrom was determined, as follows:

$$\frac{\text{weight removed stains}}{\text{weight initial stains}} \times 100$$

After classifying in increasing order the findings that were obtained, the findings pertaining to stain removal by the detergent composition of the invention or by the conventional detergent composition were correlated through linear regression to the findings pertaining to removal with water. Obtained was an equation correlating Y (cleaning effectiveness of the detergent composition) with X (removal with water). In order to obtain a simple numerical value of effectiveness, the value of Y was determined for removal with water of X=50%. This number characterizes the effectiveness of the detergent compositions in the Table IV which follows, and which reports the test results obtained with the two detergent compositions under study.

TABLE IV

| Parameters evaluated | Detergent composition according to the invention | Conventional detergent composition |
| --- | --- | --- |
| Color | L = 87.8<br>a = −0.60<br>b = +2.70 | L = 70.80<br>a = +3.27<br>b = +4.60 |
| Resistance to binding | The product remains free-flowing | A portion of the product agglutinates in the form of aggregates having a diameter of several millimeters |
| Content of residual chlorine | 88.2% | 72.2% |
| Washing effectiveness | 83.5% | 76.0% |

From the foregoing, it will be seen that detergent compositions comprised of the granular particulates according to this invention are markedly superior to those which to date have characterized the state of the art.

While the invention has been described in terms of various preferred embodiments, the skilled artisan will appreciate that various modifications, substitutions, omissions, and changes may be made without departing from the spirit thereof. Accordingly, it is intended that the scope of the present invention be limited soley by the scope of the following claims.

What is claimed is:

1. Granular particulates of sodium metasilicate, said particulates comprising a central core of essentially anhydrous sodium metasilicate and a core-enveloping sheath of sodium metasilicate pentahydrate therefor, the granular particulates comprising from 73 to 88% by weight of sodium metasilicate and from 10 to about 25% by weight of water, and having an apparent volume ranging from about 1.05 to about 1.20 g/cm³.

2. The granular particulates as defined by claim 1, comprising from 78 to 88% by weight of sodium metasilicate and from 10 to about 20% by weight of water.

3. The granular particulates as defined by claim 1, comprising from about 12 to about 18% by weight of water.

4. The granular particulates as defined by claim 1, having an average diameter ranging from about 0.55 to about 0.68 mm.

5. The granular particulates as defined by claim 4, the percentage by weight thereof having a particle size in excess of 1 mm being no greater than about 15% and the percentage by weight thereof having a particle size less than 0.25 mm being no greater than about 1%.

6. A process for the preparation of the granular particulates as defined by claim 1, comprising (i) establishing, in a zone of granulation, an agitated bed of particles of essentially anhydrous sodium metasilicate, (ii) intimately contacting said agitated particles with an atomized spray of a liquid formulation of sodium metasilicate, and thence (iii) treating the thus coated granular particulates with a stream of a cooling gas as to convert and hydrate the surface layers thereof to crystalline sodium metasilicate pentahydrate, the water of hydration thereof comprising at least 10% by weight of the total weight of the resulting particulates.

7. The process as defined by claim 6, said conversion and hydration step (iii) being carried out in a zone of maturation.

8. The process as defined by claim 7, said conversion and hydration step (iii) being initiated in a first zone of partial crystallization and completed in said zone of maturation.

9. The process as defined by claim 6, said liquid formulation of sodium metasilicate having a dry solids content of 30 to 58% by weight.

10. The process as defined by claim 9, said liquid formulation of sodium metasilicate having a dry solids content of 40 to 50% by weight.

11. The process as defined by claim 9, the ponderal ratio between the dry solids content of the liquid formulation of sodium metasilicate to the starting material sodium metasilicate ranging from 0.042 to 0.28.

12. The process as defined by claim 11, said ratio ranging from 0.08 to 0.16.

13. The process as defined by claim 6, said particles of anhydrous sodium metasilicate being maintained as a rolling bed in said granulation zone.

14. The process as defined by claim 13, the residence time of the particulates in said granulation zone ranging from 5 to 30 minutes.

15. The process as defined by claim 14, the temperature of the particulates at the outlet of said granulation zone ranging from about ambient to 50° C.

16. The process as defined by claim 15, said temperature being maintained by sweeping said granulation zone with a cocurrent stream of ambient temperature gas.

17. The process as defined by claim 8, said particulates being maintained as a falling bed in said maturation zone.

18. The process as defined by claim 17, the residence time of the particulates in said maturation zone ranging from 30 to 60 minutes.

19. The process as defined by claim 18, the temperature of the particulates at the outlet of said maturation zone being less than about 35° C.

20. The process as defined by claim 19, said temperature being maintained by sweeping said maturation zone with a countercurrent stream of ambient temperature gas.

21. The process as defined by claim 19, further comprising sifting the product particulates to desired granulometry and recycling any fines and dust to said granulation zone.

22. A detergent composition comprised of the granular particulates as defined by claim 1.

23. The detergent composition as defined by claim 22, comprising from 20 to 70% by weight of said granular particulates.

24. The detergent composition as defined by claim 23, further comprising from 10 to 70% by weight of an alkali metal phosphate or polyphosphate, from 1 to 30% by weight sodium carbonate, from 0.2 to 3% by weight of a non-ionic surfactant, from 0.2 to 5% by weight of a chlorine-releasing compound, from 0.2 to 5% by weight of at least one detergent additive, and from 0 to 50% by weight of a natural or synthetic aluminosilicate.

25. In a method for the washing of household kitchenware employing a detergent, the improvement which comprises employing as said detergent therefor, the detergent composition as defined by claim 24.

* * * * *